Figure 1:
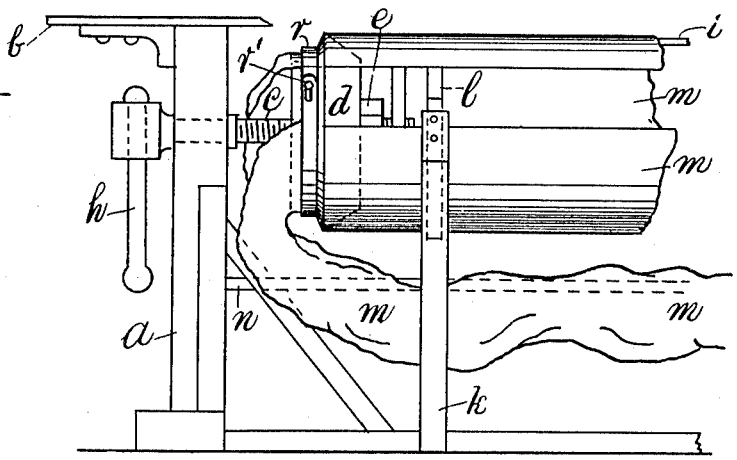

G. ROGER.
BEAMING OR MOUNTING WEFT PILE FABRICS DURING THE CUTTING OF THE PILE THEREOF.
APPLICATION FILED MAY 14, 1912.

1,066,950. Patented July 8, 1913.
4 SHEETS—SHEET 1.

Witnesses:
John C. Sanders
John A. Percival

Inventor:
George Roger.
Per Mr Wallace White
Attorney.

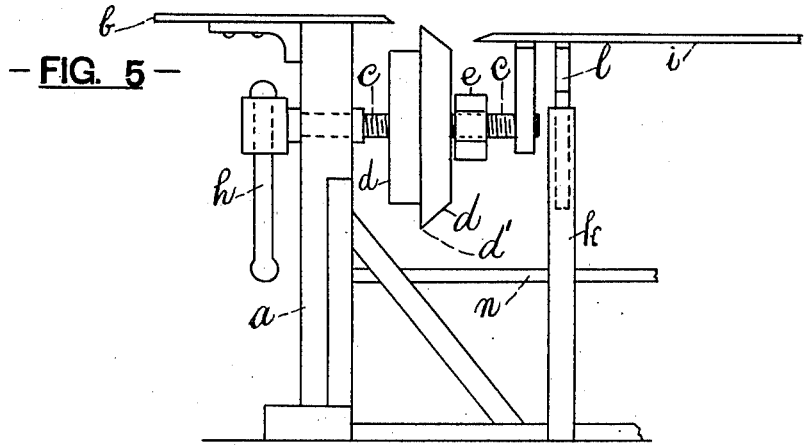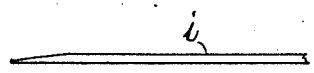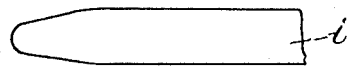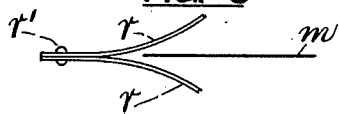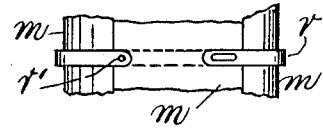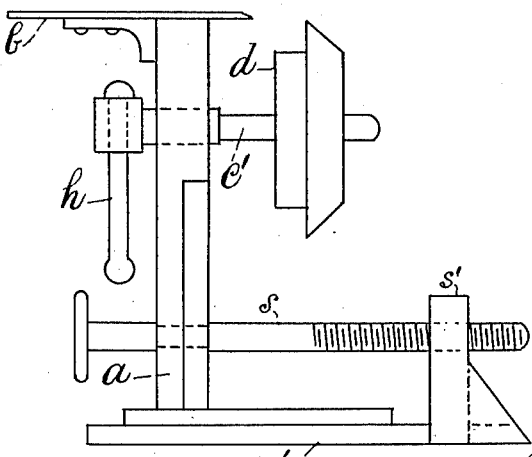

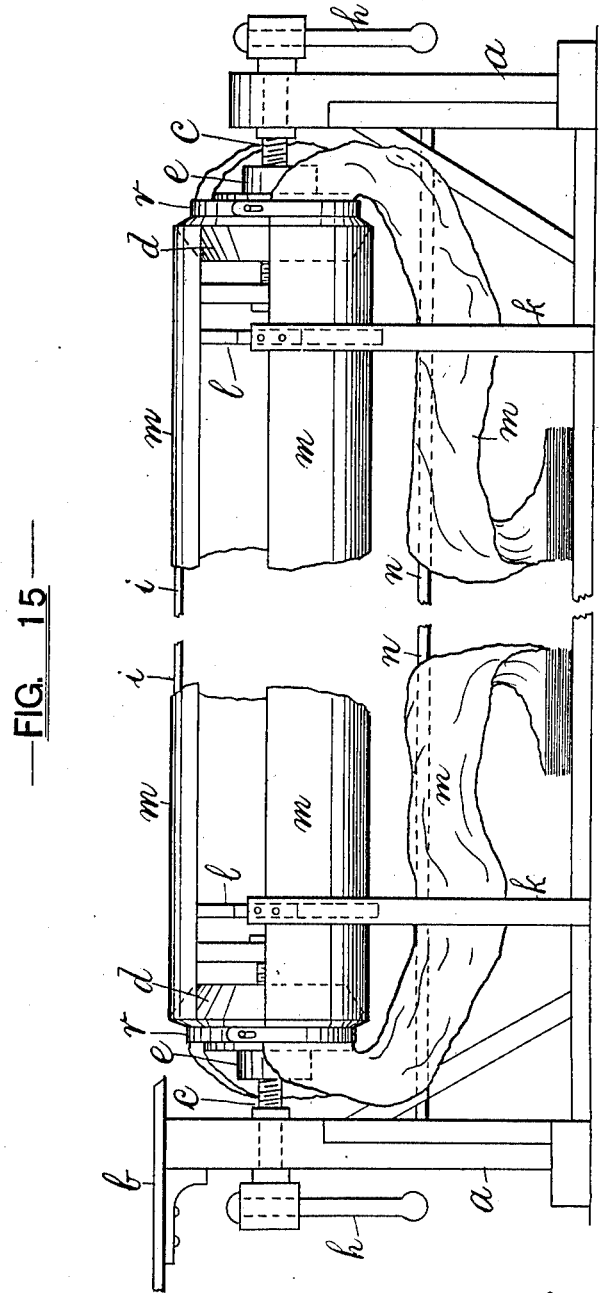

UNITED STATES PATENT OFFICE.

GEORGE ROGER, OF WARRINGTON, ENGLAND.

BEAMING OR MOUNTING WEFT PILE FABRICS DURING THE CUTTING OF THE PILE THEREOF.

1,066,950.  Specification of Letters Patent.  Patented July 8, 1913.

Application filed May 14, 1912. Serial No. 697,110.

*To all whom it may concern:*

Be it known that I, GEORGE ROGER, a subject of the King of Great Britain, residing at 314 Manchester road, Warrington, in the county of Lancaster, England, have invented certain new and useful Improvements in Beaming or Mounting Weft Pile Fabrics During the Cutting of the Pile Thereof, of which the following is a specification.

The invention relates to the beaming or mounting of weft pile fabrics during the cutting of the pile thereof, and has for object to accomplish the same in a simple and effective manner, with advantage to the cutting operation.

In the cutting of weft pile fabrics on the hand frame, the cloth, as is well known, is stretched upon such frame for a portion of its length, the remainder of the cloth being wound in the ordinary manner upon beams or rollers at the end of said frame.

According to my present invention, I so stretch or mount the part of the fabric under operation, that the width of the same is bent into tubular or other suitable form in cross section, so that the axis or longitudinal dimension of the said tube or the like is parallel, or thereabout, with the length of the race or races thereon to be cut. This may be attained, for example, by providing a mount in the form of two end pieces or blocks or rollers, having projecting flanges, and suitably carried in supports or bearings, in such manner that their axes lie in a similar direction to that of the tubular or like portion of fabric to be stretched between them. The said flanges may be beveled, that is to say formed with sharp edges or peripheries, over which the end parts of the tube of cloth may pass to facilitate the proper running out of the knife at the end of the race cut, and which race may, if desired, extend the length of the tubular fabric at the uppermost part of its outer surface, or in suitable proximity to such uppermost part.

The tubular or other form of cloth, as above described, may be partially rotated about an axis of its cross-section or its surface moved in a lateral direction to present a fresh race, or set of races, to be cut, and thereby enabling the knife to be kept to one line of motion, instead of the said knife having to be brought to each race to be cut. For this purpose of rotation the end pieces referred to may be mounted in connection with screw, or gearing whether consisting of cord and pulleys, or of toothed wheels, and means may be provided to rotate the flanged pieces at both ends simultaneously. The cloth beyond the said flanges may be pressed inward or gripped around collars, projecting from such flanged parts, or situated adjacent thereto.

To facilitate the formation of the tubular cloth, or like formation, and the gripping of the same as aforesaid, I may pass the fabric when in the flat state, between a pair of flexible bands, such as leather or thin steel bands, which tightly hold the same, when the cloth may be readily and conveniently bent into the desired shape, (by simply bending around the bands containing it), and at the same time passed around the collar at each end of the apparatus; being attached thereto, if necessary. The said bands may take into annular recesses in the collars, and occupy such position relatively to the projecting flanges as not to interfere with the free setting in or running out of the cutting knife.

The end pieces upon which the tubular cloth is mounted may be drawn apart for the purpose of stretching the latter sufficiently for cutting purposes by suitable means, such as by the action of a screw or screws operating one or both of the end pieces, or by lever and chain connection, the said end pieces, or one of them, being capable of sliding, if required, longitudinally along bearings or supports, and retained in any position after being so moved.

I may, if desirable, provide a suitable support beneath the tubular or mounted fabric, thus forming a flat surface thereat as a resistance to the knife during the cutting of a race or races.

Separated flat pieces may be provided beneath the cloth at the end portions thereof, or at one end only, the extremities of which pieces may be used as edges for bending over the cloth at or near the tubular ends thereof instead of relying upon flanges upon the end pieces forming the mount or mounts.

It will be seen that repetition of the apparatus employed by me will enable a number of pieces to be arranged as parallel tubes or formations, side by side, which may be cut simultaneously, when a number of knives are used, without unduly extending the reach of the operative at the risk of damaging the side or edge of the cloth, as heretofore. The cutting knife employed may be a hand cutting knife, and used as in the ordinary hand cutting of weft pile fabrics.

Figure 2:
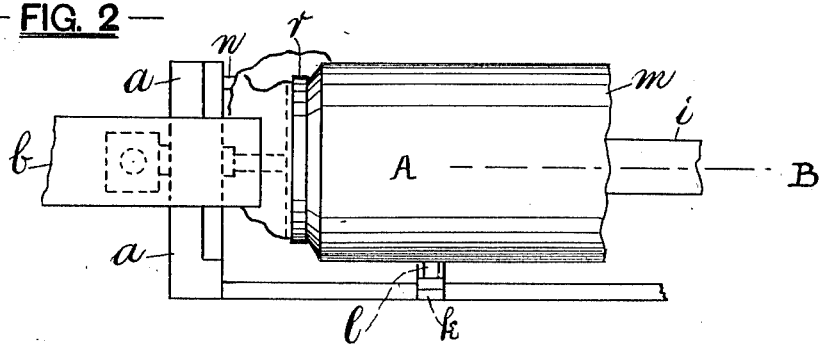
Figure 3:
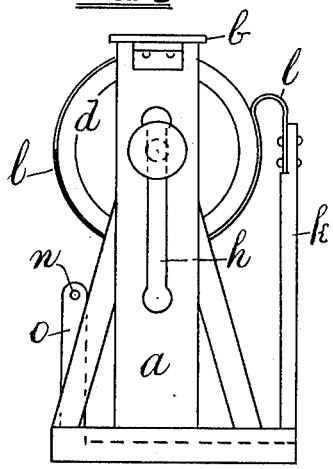
Figure 4:
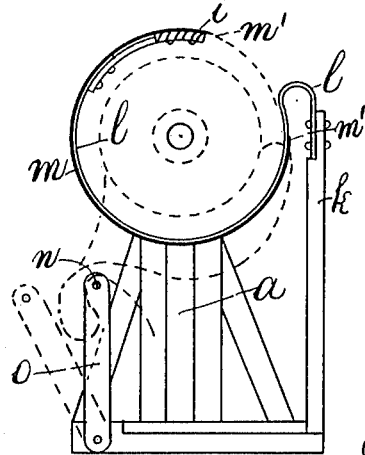
Figure 11:
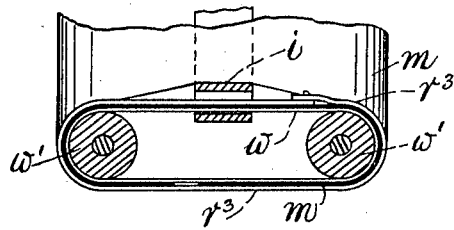
Figure 12:
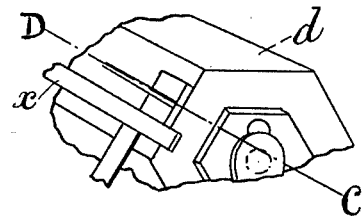
Figure 13:
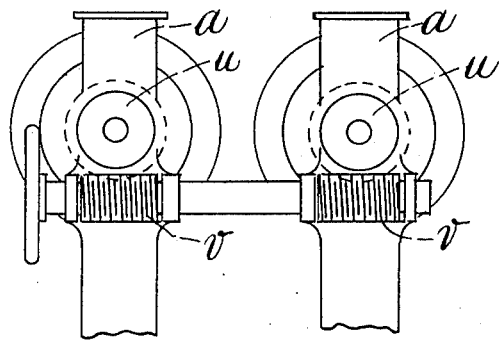
Figure 14:
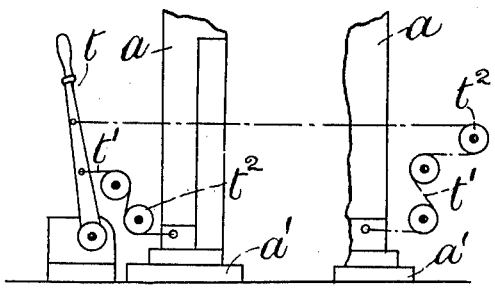

*Description of drawings.*—Figure 1 is a side elevation and Fig. 2 a plan view of an end portion of apparatus with a length of fabric mounted thereon, and arranged according to one form of my invention. Fig. 3 is an end view of Fig. 1 without the addition of the fabric named, and Fig. 4 is a sectional view showing the manner in which the mounted portion of the said fabric may be disposed about the apparatus. Fig. 5 is a side elevation similar to Fig. 1 but without the fabric mounted thereon. Figs. 6 and 7 are respectively an elevation and plan view of a detail in said apparatus. Fig. 8 is the elevation of a portion of a detail of the apparatus or attachment thereto, and Fig. 9 is a plan view of said detail in a particular condition. Fig. 10 shows in elevation a modification of Fig. 5. Figs. 11 and 12 show slightly in perspective variations in the form in which the fabric may be bent or beamed, the latter figure illustrating a method of mounting the cutting knife. Figs. 13 and 14 show further modifications of the apparatus, the latter figure being somewhat diagrammatic in form. Fig. 15 is a side elevation of the two end portions, somewhat similar to Fig. 1 of apparatus upon which the complete tube of cloth is mounted.

Referring to Fig. 5 one end portion of apparatus is shown consisting of an upright or frame $a$, carrying an arm rest $b$, for the support of the operator's arm or elbow during " setting in " of the knife at the commencement of cutting a race of the tube of cloth and provided with a screw device $c$. Engaging this screw is shown a circular piece or mount $d$, formed with a spear edge $d^1$. A nut $e$ is also shown engaging the screw $c$, and it will be seen that the same may be turned so as to make tight contact with the piece $d$, and thus enable both to turn with the screw $c$ without horizontal movement, on the operation of the hand lever $h$. If, however, the nut $e$ be released from contact with the piece referred to, the prevention of rotation of the said piece, (say by placing the hand upon the same), and the operation of the lever $h$ aforesaid, will result in such piece being moved longitudinally along the screw $c$. By this means, both motion of rotation and the said longitudinal movement may be attained with the use of the one arrangement. This screw device $c$ is shown helping to support one end of a resistance piece or board $i$, which board may also be supported by attachments $l$ conveniently spaced apart by being connected to standards, such as $k$, situated at suitable intervals between the ends of the apparatus. The board $i$ is situated under the lines of races to be cut when the cloth is mounted upon the apparatus; and I prefer such board to be thinned down and tongue shaped (Figs. 6 and 7). The cloth $m$ is, in part, shown in Figs. 1 and 2 disposed about such apparatus in manner according to my invention, that is to say, the width of the piece of cloth is passed around the end pieces $d$, thus, in the present example, forming a tube, or part of a tube of said fabric between end pieces $d$, since the opposite end of the apparatus may consist of a repetition of parts shown, but turned completely about, or situated opposite in direction.

As the line of movement of the knife may be in the direction indicated by line A. B. in Fig. 2, it will be seen that the axis of the tube of cloth is, by the means described, parallel with the races of the cloth to be cut. The remainder of the cloth may be conveniently supported by a rest or rod $n$, whether before or after being stretched in tubular form described. That is to say, a portion of the cloth having been mounted and stretched as described, the remainder may be, by hand, disposed about the rod $n$, such as more particularly indicated in Fig. 15, ready for another length therefrom to be also mounted on the completion of the cutting of the races of the preceding length referred to. It is obvious, however, that such remainder of the cloth could be beamed on rollers at the ends of the apparatus, or piled in laps, in manner well understood. The rod $n$ is shown mounted upon a standard $o$, (Figs. 3 and 4) and a number of such standards may be provided throughout the length of the apparatus. I prefer to arrange such standard so as to be capable of alteration in position, such as indicated in Fig. 4 and thus enable the apparatus to accommodate extra bulky pieces of fabric.

The cloth is shown gripped about the cylindrical portion of the end piece $d$, for which purpose I prefer to make use of flexible members $r$, such as indicated in Figs. 8 and 9. A small portion only of such members is shown in the said Fig. 8. These members are attached together at $r^1$ so that the width of the fabric $m$ may be passed between the said members, when the latter, with the inclosed cloth, may be bent around an end piece $d$ in circular or suitable form, (see more particularly Figs. 9 and 1). The end or attachment piece $r^1$ may then be connected to the opposite end of the members by engaging coinciding slots therein as shown, and well understood. Slots at both ends of the members might, however, be passed over a projection upon the collar of the piece *d* if desired.

A length of the fabric having been mounted as described, and stretched for cutting by the longitudinal movement of the end pieces, such as *d*, at the extremes of the apparatus, and referring to Fig. 15, the knife would enter or be "set into" a race of the cloth above the board *i* at the position of the edge formed by the left piece *d*, and said knife would be moved parallel with the board *i* or with the axis of the tubular cloth until such knife emerged from the race at the position of the edge formed by the right piece *d*. The races in the neighborhood of the line A. B. of Fig. 2 may be cut either by moving the knife laterally as each race is cut, say for the width of the board *i*, or by confining the movement of the knife to that of such line A. B. and bringing each race to be cut to the position of the knife by the rotation of the said end pieces *d*. In any case the said rotation or lateral movement enables all the races to be brought to and past the said line A. B.

Referring to Fig. 4 it will be seen that the fabric passes around the outside of the attachment *l*, at first, but is eventually guided within the same, as indicated by the continued broken line between the edges or selvages $m^1$. The attachment named being comparatively thin, the slight deformation in the form of the cloth between the end pieces *d* does not in practice prevent the turning of such cloth. Also with regard to said Fig. 4 it is to be observed that the full width of the cloth is contained within the selvages and mounted about or upon the piece *d*, so that the same only requires to be moved through one revolution or part of a revolution to bring every race to the position above the board *i*, to be cut, the width of the cloth so cut being coiled within itself, so to speak, as it is passed within the attachments *l* to allow of this turning movement. This can be better understood by assuming the broken line between the selvages $m^1$ shown to be continued around within said attachments *l*. In Fig. 10 the end piece *d* is attached to the spindle $c^1$ for purpose of rotation, and longitudinal movement is accomplished by the operation of a screw on a spindle or shaft *s* capable of engaging a threaded fixed bearing $s^1$ and of rotating in the frame *a*. The said frame may be capable of moving longitudinally within a slide $a^1$. It is obvious however that by extending the shaft *s* in Fig. 10 or the screw *c* in Fig. 5 throughout the length of the apparatus, and forming the said shaft (or alternatively the said screw) with right and left hand threads thereon, that the rotation of the same could cause the end pieces *d* at both ends of the apparatus to move simultaneously for stretching purposes. Fig. 14 illustrates a tensional method for attaining a similar result; wherein an operating lever *t* has attached to it cords $t^1$ passing over loosely mounted guide pulleys $t^2$, which cords are connected at their opposite ends to the uprights *a*, *a*, situated at opposite ends of the apparatus. The lever *t* may be arranged with any well known means to enable it to be temporarily held in any desired position between its extremes of motion. The particular arrangement shown only operates to widen the distance between the end frames *a*, but it is obvious that a similar tensional arrangement might be employed for closing such distance. For instance, by making the top cord $t^1$ return to the left frame *a*, after passing around the top pulley $t^2$ on the right, and attaching said returned end to the left frame *a*, and also by connecting the bottom cord $t^1$ on the left to the right frame *a*, instead of as shown.

Fig. 13 illustrates one method of simultaneously operating a number of screw devices of apparatus arranged in multiple form, side by side, suitable for those cases in which more than one fabric is desired to be cut at the same time by one operative. The said screw devices are here shown provided with gear wheels *u* attached thereto, and gearing with worms *v* mounted on the frames *a*, and actuated in any ordinary manner. But the worms may be oppositely threaded. It is obvious that a pulley could be substituted for the hand lever *h*, said pulley being in cord connection with another pulley or pulleys either mounted on the frame or elsewhere, when the operation of the cord or a pulley would turn the screw *c*. Similarly a gear wheel could be substituted for the hand lever *h*, and be operated by any suitable train of gearing in manner well understood. The spindle $c^1$ or shaft *s* in Fig. 10 could be similarly provided.

A modification in Fig. 11 shows a band *w* passing around revoluble rollers $w^1$ around which band is passed the cloth *m* in the width, and kept in close contact therewith by the flexible member $r^3$. Beyond the rollers $w^1$ the surface of the cloth is raised by passing over the board *i*, which terminates previous to such rollers, thus forming an edge at the "setting in" or "running out" position of the knife. The rotation of the rollers beforenamed will, as in the other cases bring each race or set of races to the position of the cutting knife above the plane of the board *i*.

In Fig. 12 the piece *d* is shown in the form of a hexagon, thus enabling the cloth mounted thereon to take such form in cross section. As indicated, the knife need not necessarily cut those races which come to the uppermost part of the formation of cloth, as the said knife is here shown resting upon a guide $x$ supported independently of the piece $d$ whereby the knife may cut along the line C. D. In cases of this kind it would probably be convenient to let the knife traverse the width of the face being cut along, before rotating the piece $d$ to bring a fresh race to the same position. In this case last referred to, the piece $d$ forms a solid core for the cloth mounted thereon.

It will be seen that according to my invention described, the fabric is mounted by being bent in the direction of its width, and means are provided for moving the mount or the cloth by which mount it is supported about an axis of the system, such axis being, in the majority of the cases, the central axis of the tubular or like cloth, but which, in the case of Fig. 11 of the drawings is the line approximately parallel with the races of the mounted cloth and passing through the center of the line joining the centers of the rollers $w^1$.

I claim:—

1. For the purpose of cutting the pile of weft pile fabrics, and in combination, a mount for supporting a fabric bent in the direction of its width about said mount, and means for moving such mount about an axis of the system, substantially as herein set forth.

2. For the purpose of cutting the pile of weft pile fabrics, and in combination, a mount for supporting a fabric bent in the direction of its width about said mount, means for moving such mount about an axis of the system, and means for longitudinally moving apart the mount end portions, substantially as herein set forth.

3. For the purpose of cutting the pile of weft pile fabrics, and in combination, a mount for supporting a fabric bent in the direction of its width about said mount, a flexible member for attaching said cloth to the mount end, standard supported attachments passing within the mounted cloth for supporting and guiding the latter, a board carried by said attachment situated below the races to be cut of the mounted cloth, a frame supported screw working within the end of the mount for moving the same longitudinally, a nut on said screw for making contact with the mount end for purpose of axial movement thereof, substantially as herein set forth.

4. For the purpose of cutting the pile of weft pile fabrics, and in combination, a mount for supporting a fabric bent in the direction of its width about said mount, a longitudinally movable frame carrying an end of said mount, a rotatable spindle attached to such mount end and supported by said frame, a screw spindle passing through said frame, a fixture within which said screw works longitudinally moving said frame, substantially as herein set forth.

In testimony whereof I hereunto affix my signature in presence of two witnesses.

GEORGE ROGER.

Witnesses:
  ARTHUR GADD,
  GEORGE FREDERICK GADD.